US012478318B2

(12) United States Patent
Liu et al.

(10) Patent No.: US 12,478,318 B2
(45) Date of Patent: Nov. 25, 2025

(54) NON-CONTACT FATIGUE DETECTION METHOD AND SYSTEM

(71) Applicant: CENTRAL CHINA NORMAL UNIVERSITY, Hubei (CN)

(72) Inventors: Sannyuya Liu, Hubei (CN); Zongkai Yang, Hubei (CN); Liang Zhao, Hubei (CN); Xiaoliang Zhu, Hubei (CN); Zhicheng Dai, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 211 days.

(21) Appl. No.: 18/038,989

(22) PCT Filed: Jun. 23, 2021

(86) PCT No.: PCT/CN2021/101744
§ 371 (c)(1),
(2) Date: May 26, 2023

(87) PCT Pub. No.: WO2022/257187
PCT Pub. Date: Dec. 15, 2022

(65) Prior Publication Data
US 2024/0023884 A1    Jan. 25, 2024

(30) Foreign Application Priority Data
Jun. 11, 2021  (CN) .......................... 202110652542.7

(51) Int. Cl.
A61B 5/00        (2006.01)
A61B 5/0205      (2006.01)
(Continued)

(52) U.S. Cl.
CPC .............. A61B 5/48 (2013.01); A61B 5/0205 (2013.01); A61B 5/05 (2013.01); A61B 5/7267 (2013.01);
(Continued)

(58) Field of Classification Search
CPC ........... A61B 5/48; A61B 5/0205; A61B 5/05; A61B 5/7267; A61B 5/024; A61B 5/0816;
(Continued)

(56) References Cited

U.S. PATENT DOCUMENTS 10,292,585 B1    5/2019  Talwai et al.
2017/0036541 A1  2/2017  Brankovic et al.
(Continued)

FOREIGN PATENT DOCUMENTS

CN    110115592    8/2019
CN    111166357    5/2020
(Continued)

OTHER PUBLICATIONS

Xiaoliang Zhu et al., "Hybrid Attention Cascade Network for Facial Expression Recognition", Sensors, Mar. 12, 2021, pp. 1-15, vol. 21.
(Continued)

Primary Examiner — Iriana Cruz
(74) Attorney, Agent, or Firm — JCIPRNET

(57) ABSTRACT

Disclosed are a non-contact fatigue detection method and system. The method comprises: sending a millimeter-wave (mmWave) radar signal to a person being detected, receiving an echo signal reflected from the person, and determining a time-frequency domain feature, a non-linear feature and a time-series feature of a vital sign signal; acquiring a facial video image of the person, and performing facial detection and alignment on the basis of the facial video image, for extracting a time domain feature and a spatial domain feature of the person's face; fusing the determined vital sign signal with the time domain feature and the spatial domain feature of the person's face, for obtaining a fused feature; inputting the fused feature into a classifier to perform fatigue state recognition of said person, and determining whether (Continued)

the person is in a fatigued state by the fused feature. By fusing the two detection techniques, the method effectively suppressing the interference of subjective and objective factors, and improving the accuracy of fatigue detection.

8 Claims, 7 Drawing Sheets

(51) Int. Cl.
  *A61B 5/05*  (2021.01)
  *G06V 40/16*  (2022.01)
  *A61B 5/024*  (2006.01)
  *A61B 5/08*  (2006.01)
(52) U.S. Cl.
  CPC ............ *G06V 40/161* (2022.01); *A61B 5/024* (2013.01); *A61B 5/0816* (2013.01); *A61B 5/725* (2013.01); *A61B 5/7257* (2013.01)
(58) Field of Classification Search
  CPC .... A61B 5/725; A61B 5/7257; G06V 40/161; G06V 10/764; G06V 10/806; G06V 40/15; G06V 40/171; G06V 10/82; G06F 2218/10; G06F 2218/08; G06F 2218/12; G06N 3/08; G06N 3/045
  See application file for complete search history.

(56) References Cited

U.S. PATENT DOCUMENTS

| | | | |
|---|---|---|---|
| 2021/0304001 A1* | 9/2021 | Po | A61B 5/0022 |
| 2022/0189209 A1* | 6/2022 | Song | G06V 10/761 |
| 2024/0000345 A1* | 1/2024 | Yang | A61B 5/024 |

FOREIGN PATENT DOCUMENTS

| | | |
|---|---|---|
| CN | 111329455 | 6/2020 |
| CN | 112401863 | 2/2021 |
| CN | 112418095 | 2/2021 |
| CN | 112686094 | 4/2021 |

OTHER PUBLICATIONS

"International Search Report (Form PCT/ISA/210) of PCT/CN2021/101744", mailed on Feb. 25, 2022, with English translation thereof, pp. 1-6.
"Written Opinion of the International Searching Authority (Form PCT/ISA/237) of PCT/CN2021/101744", mailed on Feb. 25, 2022, pp. 1-4.

* cited by examiner

NON-CONTACT FATIGUE DETECTION METHOD AND SYSTEM

CROSS-REFERENCE TO RELATED APPLICATION

This application is a 371 of international application of PCT application serial no. PCT/CN2021/101744, filed on Jun. 23, 2021, which claims the priority benefit of China application serial no. 202110652542.7, filed on Jun. 11, 2021. The entirety of each of the above-mentioned patent applications is hereby incorporated by reference herein and made a part of this specification.

TECHNICAL FIELD

The disclosure belongs to the field of information technology, and more specifically relates to a non-contact fatigue detection method and system.

DESCRIPTION OF RELATED ART

Non-contact fatigue state detection, such as: driving fatigue detection, learning fatigue detection, and so on, has been gradually applied in many situations in academia and industry. Most of the existing fatigue state detection is performed based on video image processing technology, that is, by extracting facial image features in the video, such as: blinking frequency and contour changes of eyes, etc., to determine the fatigue state. Although said technology is able to achieve a high accuracy currently, there are still many defects. For example, detection error is very likely to occur due to objective factors such as dim light, uneven illumination, and face turning away and tilting. A lot of interference is generated during tests due to the influence of subjective factors such as pretending to close eyes and faking facial expressions to hide the true state.

In the meantime, since physiological signals are characterized in uniqueness and stability, fatigue state detection based on physiological signals continues to develop. Generally speaking, fatigue detection based on physiological signals typically may be classified into two types as follows: (1) Tracking physiological signals based on wearable devices, such as electrocardiogram, photoplethysmography, and electroencephalogram; as a contact detection method, the shortcoming of such method lies in lack of convenient in practice (e.g., causing discomfort and skin irritation); (2) Tracking physiological signals based on millimeter-wave (mmWave) radar, such as: respiratory signal and heartbeat signal; as a non-contact detection method, such method has gradually received widespread attention in the field of industrial vehicles. Fatigue detection based on mmWave radar has the advantages of low power loss and high precision, but there are still some problems: as far as signal acquisition is concerned, mmWave radar is likely to be interfered by environmental noise and body movement of the subject under test and so on, and no solutions have been found to said problems. As far as signal processing is concerned, existing detection methods are often limited to the calculation of time-frequency domain features. Time-frequency domain features include, for example, peak-to-peak intervals, and there is a lack of attention to nonlinear features and time-series features in such method.

SUMMARY

In view of the defects of the related art, the purpose of the present disclosure is to provide a non-contact fatigue detection method and system, aiming to solve the problems that on the one hand, the existing fatigue detection method based on video image processing technology is easily interfered by objective factors in environments, as well as person-involved subjective factors, etc; on the other hand, the fatigue detection technology based on mmWave radar is susceptible to interference from environmental noise and body movements of the subjects and the like.

In order to achieve the above purpose, the first aspect of the present disclosure provides a non-contact fatigue detection method, which includes the following steps: sending an mmWave radar signal to a person to be subjected to detection, receiving an echo signal reflected from the person to be subjected to detection, and after performing clutter suppression and echo selection on the echo signal, extracting a vital sign signal of the person to be subjected to detection, and determining a time-frequency domain feature, a nonlinear feature and a time-series feature of the vital sign signal; and the vital sign signal includes a respiratory signal and a heartbeat signal; acquiring a facial video image of the person to be subjected to detection, and performing facial detection and alignment on the basis of the facial video image, so as to extract a time domain feature and a spatial domain feature of the face of the person to be subjected to detection; fusing the time-frequency domain feature, the nonlinear feature and the time-series feature of the vital sign signal with the time domain feature and the spatial domain feature of the face of the person to be subjected to detection, so as to obtain a set of fused features; inputting the fused features into a pre-trained classifier to perform fatigue state recognition of the person to be subjected to detection, and determining whether the person to be subjected to detection is in a fatigue state; and the classifier divides, on the basis of the fused features of the person to be subjected to detection, the state of the person to be subjected to detection into three states, i.e., alert, normal and fatigue, and both the alert and normal states are non-fatigue states.

In an optional example, the step of performing facial detection and alignment on the basis of the facial video image, so as to extract a time domain feature and a spatial domain feature of the face of the person to be subjected to detection is specifically as follows: performing facial detection on the facial video image to extract facial feature points and obtain a facial feature point sequence; calculating the position of a middle point of the face based on the facial feature point sequence according to the point information of the eyes and eyebrows in the feature points; calibrating and aligning the face in the current facial video image by adopting affine transformation; adjusting the aligned facial video image dataset to a picture with a preset size, generating a frame sequence with L frame images as a group, and dividing the frame sequence into K parts through a time-sensitive network processing flow, randomly selecting a frame from each part as the final input frame to obtain a sequence of K frames and generate a dataset, and L and K are both integers greater than 0; inputting the dataset into a residual network ResNet50 to extract spatial features of the facial video image; utilizing a mixed attention module to extract inter-frame correlation features, and the mixed attention module is composed of two parts: a self-attention model and a spatial attention model; specifically, the extracted spatial features are input into the self-attention model to extract the correlation features of a single frame; the correlation features of the single frame are input into the spatial attention model to extract spatial correlation features between adjacent frames; the spatial features are fused with the correlation features of a single frame and the spatial correlation features between adjacent frames, and the fused features are input to a gated recurrent unit (GRU) to extract the temporal feature of the facial video image; inputting the spatial features and temporal features of the facial video image to a fully connected (FC) layer, and characterizing the spatial domain features and time domain features of the face of the person to be subjected to detection by the parameters of the FC layer.

In an optional example, after performing clutter suppression and echo selection on the echo signal, the step of extracting a vital sign signal of the person to be subjected to detection, and determining a time-frequency domain feature, a nonlinear feature and a time-series feature of the vital sign signal is specifically as follows: reconstructing the waveform of the echo signal, specifically: utilizing wavelet bandpass filtering to eliminate noise, and a respiratory signal and a heartbeat signal therein are extracted to serve as the vital sign signal; utilizing time-frequency analysis and nonlinear analysis techniques to extract time-frequency domain features (including both time domain features and frequency domain features) and nonlinear features of the vital sign signal; for the respiratory signal, the extracted time-frequency domain features and nonlinear features include mean, variance, power spectral density, fractal dimension, approximate entropy, etc.; for the heartbeat signal, the extracted time domain features include single-beat features and multi-beat features; the extracted frequency domain features include: low frequency components, high frequency components, ratio between low and high frequency components, spectral kurtosis and skewness, etc.; the extracted nonlinear features include: approximate entropy, sample entropy, Lyapunov exponent, Hurst exponent, and detrended fluctuation analysis exponent; the purpose of the single-beat feature is to extract the instantaneous change feature of each heartbeat; the purpose of the multi-beat feature and frequency domain feature is to extract the long-term change feature of multiple heartbeats; the purpose of the nonlinear feature is to further extract the nonlinear change feature of the heartbeat, the nonlinear feature has a high correlation with the fatigue state and therefore is able to improve the fatigue state recognition accuracy of the classifier; utilizing deep learning technology to extract time-series features: first of all, a sub-sliding window is disposed in a detection window, and the time-frequency domain features and nonlinear features of the vital sign signal in each sub-sliding window are extracted respectively; then, the corresponding features that are extracted in a chronological order are sequentially input into the model with combination of convolutional neural network (CNN) and bidirectional long short-term memory (BiLSTM) neural network, the features of FC layer thereof are extracted as the time-series features of the vital sign signal; selecting features that are relatively highly correlated with fatigue state classification from the extracted features based on statistical analysis and machine learning to serve as the time-frequency domain features, nonlinear features, and time-series features of the final vital sign signal.

In an optional example, the step of fusing the time-frequency domain feature, the nonlinear feature and the time-series feature of the vital sign signal with the time domain feature and the spatial domain feature of the face of the person to be subjected to detection, so as to obtain a fused feature is specifically as follows: utilizing polynomial feature generating and deep feature synthesis technologies to fuse the time-frequency domain features, nonlinear features and time-series features of the vital sign signal of the sliding detection windows and the sub-windows thereof, as well as the time domain features and spatial domain features of the face of the persons to be subjected to detection, thereby obtaining preliminary fused features; merging the preliminary fused features with the time-frequency domain features, nonlinear features, and time-series features of the vital sign signal as well as the time domain features and spatial domain features of the face of the person to be subjected to detection, thereby obtaining merged features; utilizing the transformer model to select the merged features of the sliding detection windows and the sub-windows thereof based on the attention mechanism; for sliding detection windows, feature selection is performed based on the attention mechanism; for sub-windows, after inputting corresponding features into the transformer time-series model in the chronological order, feature selection is performed based on the attention mechanism; merging the features selected by the sliding detection windows and the sub-windows to obtain the fused features of the person to be subjected to detection.

In an optional example, the classifier is trained through the following steps: determining training samples, and the training samples include fused features of multiple trainers; the fused features of each trainer include the trainer's mmWave radar signal features and facial video features; the mmWave radar features include: time-frequency domain features, nonlinear features, and time-series features of vital sign signal; the facial video features include: the time domain feature and the spatial domain feature of the person's face; adding a state label to the dataset corresponding to the fused features of each trainer to form a training dataset for each trainer; the state label indicates the trainer's state corresponding to the fused features, and the trainer's state belongs to one of the alert state, normal state and fatigue state; inputting the training dataset of each trainer into the classifier to train the learning classifier in combination with the state labels therein and obtain the trained classifier.

The second aspect of the present disclosure provides a non-contact fatigue detection system, which includes: an mmWave feature determining unit, which is configured to send an mmWave radar signal to a person to be subjected to detection, receive an echo signal reflected from the person to be subjected to detection; after performing clutter suppression and echo selection on the echo signal, extract a vital sign signal of the person to be subjected to detection, and determine a time-frequency domain feature, a nonlinear feature and a time-series feature of the vital sign signal; and the vital sign signal includes a respiratory signal and a heartbeat signal; a facial video feature determining unit, which is configured to acquire a facial video image of the person to be subjected to detection, and perform facial detection and alignment on the basis of the facial video image, so as to extract a time domain feature and a spatial domain feature of the face of the person to be subjected to detection; a feature fusing unit, which is configured to fuse the time-frequency domain feature, the nonlinear feature and the time-series feature of the vital sign signal with the time domain feature and the spatial domain feature of the face of the person to be subjected to detection, so as to obtain a fused feature; a fatigue detecting unit, which is configured to input the fused feature into a pre-trained classifier to perform fatigue state recognition of the person to be subjected to detection, and determine whether the person to be subjected to detection is in a fatigue state; and the classifier divides, on the basis of the fused feature of the person to be subjected to detection, the state of the person to be subjected to detection into three states, i.e., an alert state, a normal state and a fatigue state, and both the alert and normal states are non-fatigue states.

In an optional example, the facial video feature determining unit performs facial detection on the facial video image to extract facial feature points and obtain a facial feature point sequence; calculates the position of the middle point of the face based on the facial feature point sequence according to the point information of the eyes and eyebrows in the feature points; calibrates and aligns the face in the current facial video image by adopting affine transformation; adjusts the aligned facial video image dataset to a picture of a preset size, generates a frame sequence with L frame images as a group, and divides the frame sequence into K parts through a time-sensitive network processing flow, randomly selects a frame from each part as the final input frame to obtain a sequence of K frames and generate a dataset, and L and K are both integers greater than 0; inputs the dataset into a residual network ResNet50 to extract spatial features of the facial video image; uses a mixed attention module to extract inter-frame correlation features, and the mixed attention module is composed of two parts: a self-attention model and a spatial attention model; specifically, the extracted spatial features are input into the self-attention model to extract the correlation features of a single frame; the correlation features of a single frame are input into the spatial attention model to extract spatial correlation features between adjacent frames;

the spatial features are fused with the correlation features of a single frame and the spatial correlation features between adjacent frames, and the fused features are input to a GRU to extract the temporal features of the facial video image; inputs the spatial features and temporal features of the facial video image to an FC layer, and characterizes the spatial domain features and time domain features of the face of the person to be subjected to detection by the parameters of the FC layer.

In an optional example, the mmWave feature determining unit reconstructs the waveform of the echo signal, specifically: utilizes wavelet bandpass filtering to eliminate noise, and a respiratory signal and a heartbeat signal therein are extracted to serve as the vital sign signal; utilizes time-frequency analysis and nonlinear analysis techniques to extract time-frequency domain features and nonlinear features of the vital sign signal; for the respiratory signal, the extracted time-frequency domain features and nonlinear features include mean, variance, power spectral density, fractal dimension, approximate entropy, etc.; for the heartbeat signal, the extracted time domain features include single-beat features and multi-beat features; the extracted frequency domain features include: low frequency components, high frequency components, ratio between low and high frequency components, spectral kurtosis and skewness, etc.; the extracted nonlinear features include: approximate entropy, sample entropy, Lyapunov exponent, Hurst exponent, and detrended fluctuation analysis exponent; the purpose of the single-beat feature is to extract the instantaneous change feature of each heartbeat; the purpose of the multi-beat feature and frequency domain feature is to extract the long-term change feature of multiple heartbeats; the purpose of the nonlinear feature is to further extract the nonlinear change feature of the heartbeat, the nonlinear feature has a high correlation with the fatigue state and therefore is able to improve the fatigue state recognition accuracy of the classifier; utilizes deep learning technology to extract time-series features: first of all, a sub-sliding window is disposed in a detection window, and the time-frequency domain features and nonlinear features of the vital sign signal in each sub-sliding window are extracted respectively; then, the corresponding features that are extracted based on time sequence are sequentially input into the model with combination of convolutional neural network (CNN) and bidirectional long short-term memory (BiLSTM), the features of FC layer thereof are extracted as the time-series features of the vital sign signal; and selects features that are relatively highly correlated with fatigue state classification from the extracted features based on statistical analysis and machine learning to serve as the time-frequency domain features, nonlinear features, and time-series features of the final vital sign signal.

In an optional example, the feature fusing unit uses polynomial feature generating and deep feature synthesis technologies to fuse the time-frequency domain features, nonlinear features and time-series features of the vital sign signal of the sliding detection windows and the sub-windows thereof, as well as the time domain features and spatial domain features of the face of the persons to be subjected to detection, thereby obtaining preliminary fused features; merges the preliminary fused features with the time-frequency domain features, nonlinear features, and time-series features of the vital sign signal as well as the time domain features and spatial domain features of the face of the person to be subjected to detection, thereby obtaining merged features; utilizes the transformer model to select the merged features of the sliding detection windows and the sub-windows thereof based on the attention mechanism; for sliding detection windows, feature selection is performed based on the attention mechanism; for sub-windows, after inputting the corresponding features into the transformer time-series model in chronological order, feature selection is performed based on the attention mechanism; and merges the features selected from the sliding detection windows and the sub-windows to obtain the fused features of the person to be subjected to detection.

In an optional example, the system further includes a classifier training unit, which is configured to determine training samples, and the training samples include fused features of multiple trainers; the fused features of each trainer include the trainer's mmWave radar signal features and facial video features; the mmWave radar features include: time-frequency domain features, nonlinear features, and time-series features of vital sign signal; the facial video features include: the time domain feature and the spatial domain feature of the person's face; add a state label to the dataset corresponding to the fused feature of each trainer to form a training dataset for each trainer; the state label indicates the trainer's state corresponding to the fused features, and the trainer's state belongs to one of the alert state, normal state and fatigue state; and input the training dataset of each trainer into the classifier to train the learning classifier in combination with the state labels therein and obtain the trained classifier.

DESCRIPTION OF THE EMBODIMENTS

In order to make the purpose, technical solution and advantages of the present disclosure more comprehensible, the present disclosure will be further described in detail below in conjunction with the accompanying drawings and embodiments. It should be understood that the specific embodiments described here are only used to explain the present disclosure, not to limit the present disclosure.

Figure 1:
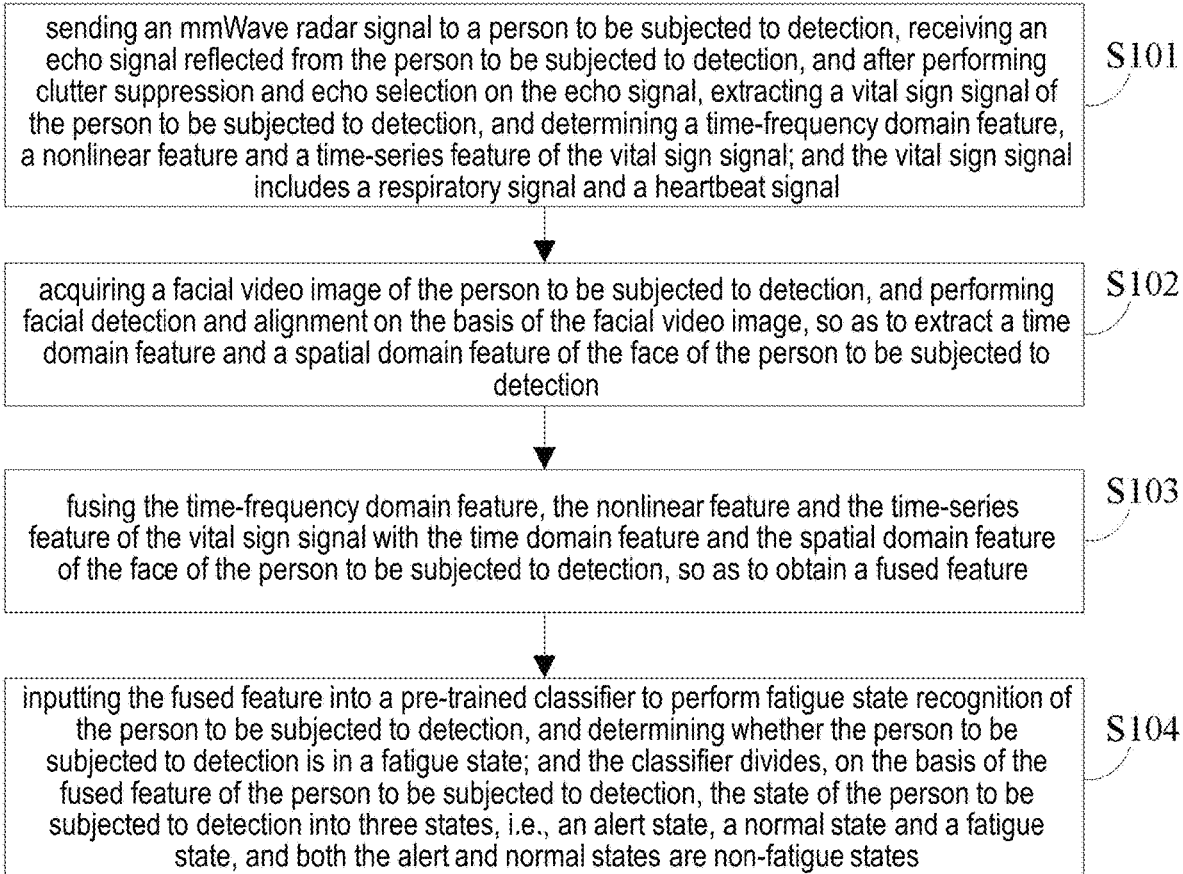
FIG. 1 is a flow chart of a non-contact fatigue detection method provided by an embodiment of the present disclosure.

FIG. 1 is a flow chart of a non-contact fatigue detection method provided by an embodiment of the present disclosure. As shown in FIG. 1, the method includes the following steps:

S101, An mmWave radar signal is sent to a person to be subjected to detection, an echo signal reflected from the person to be subjected to detection is received, and after performing clutter suppression and echo selection on the echo signal, a vital sign signal of the person to be subjected to detection is extracted, and a time-frequency domain feature, a nonlinear feature and a time-series feature of the vital sign signal are determined, and the vital sign signal includes a respiratory signal and a heartbeat signal. Specifically, an mmWave radar signal is sent to a person to be subjected to detection, and an echo signal reflected from the person to be subjected to detection is received; after performing clutter suppression and echo selection on the echo signal, a vital sign signal (including respiratory signal and heartbeat signal) of the person to be subjected to detection is extracted; the corresponding time-frequency domain features, nonlinear features and time-series features are extracted from the vital sign signal of the person to be subjected to detection; and features are fused to select typical features related to a fatigue state.

S102, A facial video image of the person to be subjected to detection is acquired, and facial detection and alignment are performed on the basis of the facial video image, so as to extract a time domain feature and a spatial domain feature of the face of the person to be subjected to detection. Specifically, the face position information in the video image is obtained and feature points thereof are extracted; face feature points are aligned and the input dataset is generated; a ResNet network is adopted to extract spatial features of video data; a mixed attention module is utilized to extract correlation features of a single frame and inter-frame correlation features and the features are fused; the fused features are input into a GRU to extract the temporal features and the features are output to an FC layer, and the spatial domain features and time domain features of the face of the person to be subjected to detection are characterized.

S103, The time-frequency domain feature, the nonlinear feature and the time-series feature of the vital sign signal are fused with the time domain feature and the spatial domain feature of the face of the person to be subjected to detection, so as to obtain a fused feature.

Figure 2:
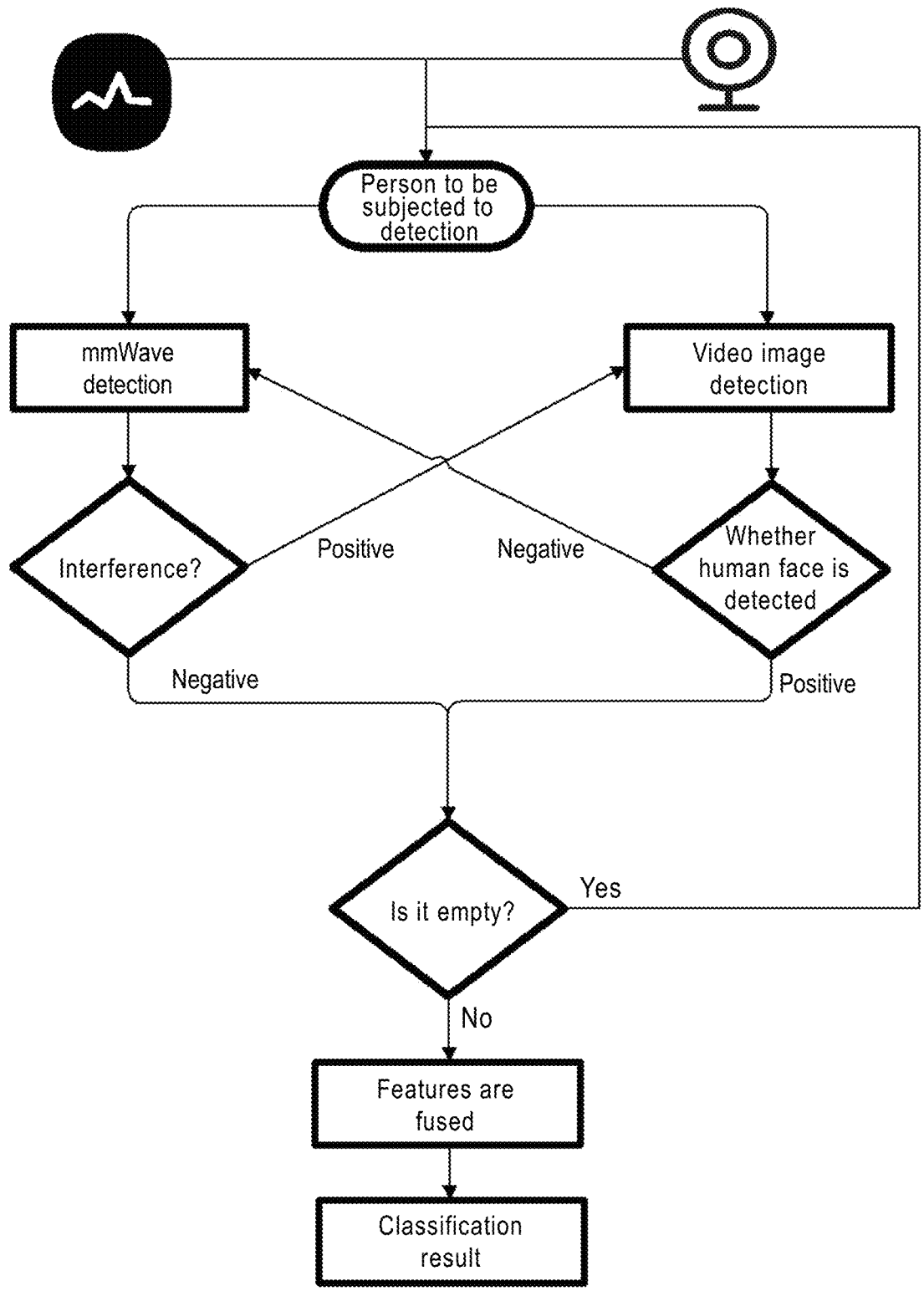
FIG. 2 is a partial flow chart of fusing features provided by an embodiment of the present disclosure.

It may be understood that the features obtained by mmWave radar and video image processing technology are fused. Specifically, the process is shown in FIG. 2. If there is an abnormality in the mmWave, for example: there is environmental interference or the person to be subjected to detection shakes continuously during the test, there will be no output of mmWave features, the mmWave data in the detection window will be deleted, and fatigue detection is performed based on video images. If there is an abnormality in the video image and the person's face cannot be detected, for example, the ambient light is not bright, and the face is tilted and turns away, etc., there will be no output of video image features, the video data in the detection window will be deleted, and fatigue detection is performed based on the mmWave radar. If neither the mmWave nor the video image detects the person to be subjected to detection, it will be shown that there is no person to be subjected to detection because there is no feature for subsequent calculation, and the cycle continues again for fatigue detection to be performed in the next detection window. If there is no abnormality in the detection results of the person to be subjected to detection in the two methods, the fatigue detection is carried out by comprehensively using the features extracted by the mmWave detection and the video image detection on basis of fusing the two features.

S104, The fused features are input into a pre-trained classifier to perform fatigue state recognition of the person to be subjected to detection, and it is determined whether the person to be subjected to detection is in a fatigue state; and the classifier divides, on the basis of the fused features of the person to be subjected to detection, the state of the person to be subjected to detection into three states, i.e., alert, normal and fatigue, and both the alert and normal states are non-fatigue states.

In a specific embodiment, step S101 is implemented through the following process: transmitting an mmWave radar signal to the person to be subjected to detection; receiving the echo signal reflected from the person to be subjected to detection; after performing clutter suppression and echo selection on the echo signal, extract the vital sign signal of the person to be subjected to detection; respectively calculating the time-frequency domain features, nonlinear features and time-series features of the vital sign signal in each sliding detection window.

In a specific embodiment, step S102 is implemented through the following process: collecting video image information of the person to be subjected to detection in real time; extracting facial feature points; aligning person's face; generating input datasets; inputting ResNet network for spatial feature extraction; inputting mixed attention module for inter-frame correlation feature extraction; inputting GRU unit for temporal feature extraction; inputting features into an FC layer.

The disclosure provides a non-contact fatigue detection method and system, which have the advantages of high reliability, high robustness, low power, good convenience and the like. The detection principle is as follows: First, the detection system simultaneously monitors mmWave data and video image data. The mmWave module sends low power-loss mmWaves to the person to be subjected to detection, and detects the echo signal generated by the signal reflected from the human body (such as: chest cavity, etc.), thereby extracting vital sign signal such as respiratory signal and heartbeat signal to calculate time-frequency domain features, nonlinear features and time-series features thereof. Secondly, face detection, facial feature point extraction, face alignment and so on are performed with respect to the video image data, and the time domain feature information and spatial domain feature information are extracted on basis of the above. Finally, fatigue detection is performed based on a classifier on basis of the fusion of mmWave and video image features.

Figure 3:
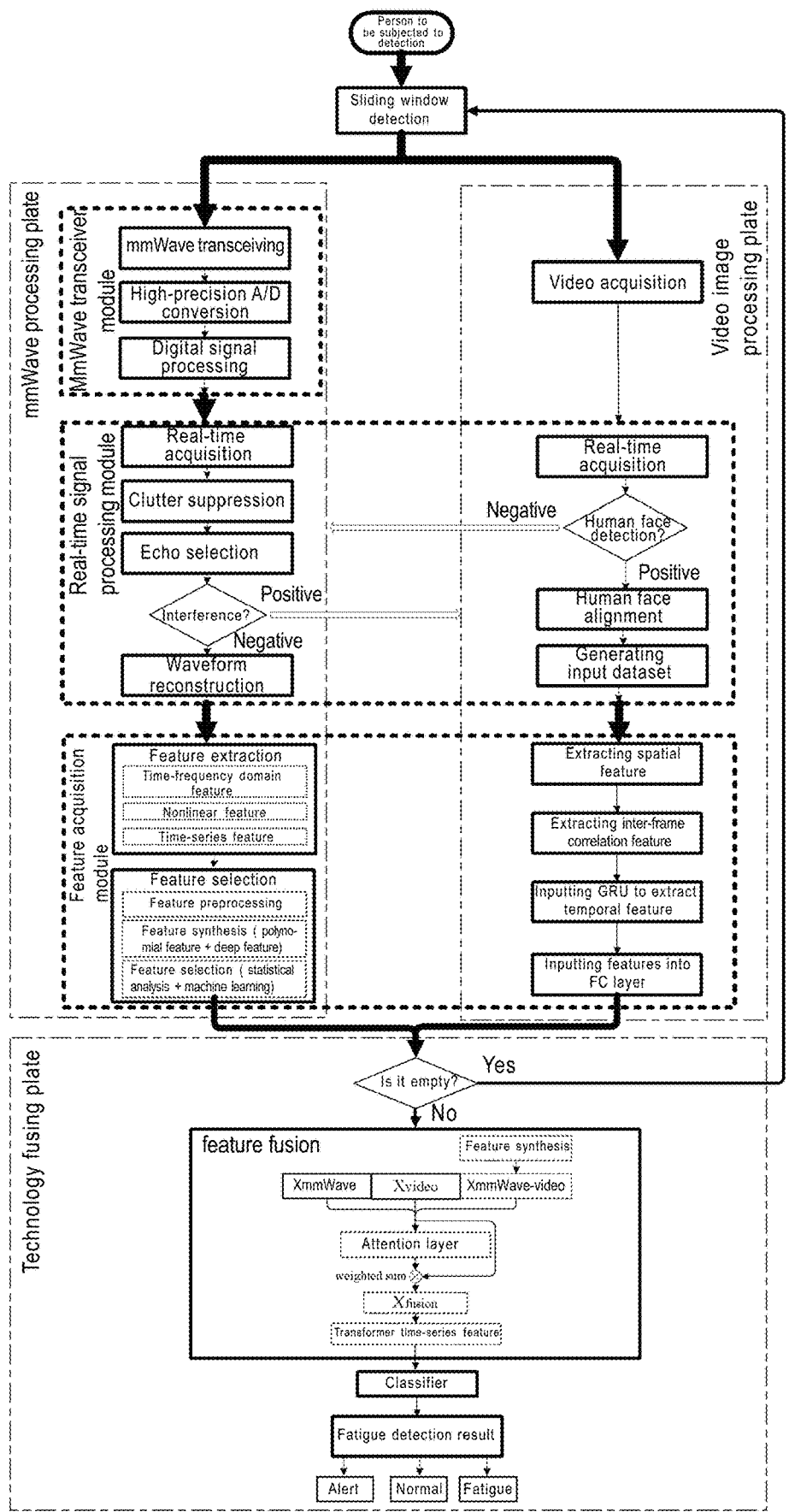
FIG. 3 is a block diagram of a non-contact fatigue detection system provided by an embodiment of the present disclosure.

FIG. 3 is a block diagram of a non-contact fatigue detection system provided by an embodiment of the present disclosure. As shown in FIG. 3, the system mainly includes the following:

(1) mmWave Radar Processing

The mmWave radar mainly includes: (1) an mmWave transceiver module; (2) a real-time signal processing module; (3) a feature extraction module.

(1) The mmWave transceiver module is specifically configured to: transmit mmWaves and receive mmWave echo signals. Specifically, the transmitting end generates a chirp signal, and after the chirp signal passes through the power amplifier, a transmitting antenna sends a sawtooth wave with Chirp period of $T_f$ and a frequency modulation bandwidth of B, and a frame period thereof (that is, the sawtooth wave repetition period, each frame period contains multiple Chirps) is $T_i$. The receiving antenna at the receiving end detects and preprocesses echo signals generated by reflections from various objects and human bodies in the receiving environment.

(2) The real-time signal processing module is specifically configured to: perform real-time acquisition and processing of echo signals, and extract both respiratory signal and heartbeat signal. The operation mainly includes four steps: real-time acquisition of echo signals, clutter suppression, echo selection, and waveform reconstruction. The specific process is as follows:

(2-1) Real-time acquisition. The UDP port is monitored through the Socket module, UDP data packets are captured in real time and the raw data is stored in the host computer.

(2-2) Clutter suppression. The echo signal of the mmWave may include various clutter interferences. Adaptive background subtraction and singular value decomposition are adopted respectively to filter out stationary noise that is reflected from static objects (such as tables and walls) and non-stationary noise that is reflected from moving objects.

(2-3) Echo selection. The distance of the person to be subjected to detection is accurately positioned, and a column of elements characterizing the distance unit is selected from the echo signal matrix Q; the column of elements represents the original raw signal includes both respiratory signal and heartbeat signal of the person to be subjected to detection. Specifically, firstly, Fourier transform is performed on each row of the echo signal to obtain an N×M range-time map matrix R. N represents the number of frames, M represents the number of sampling points of each Chirp; each column of the matrix R characterizes a distance unit. Next, the sum of energy of various distance units are calculated, $E(m)=\Sigma_{n=1}^{N}|R_n(n)|^2$, $m \in [1, M]$. Third, the column $m_{max}$ where the maximum sum of energy is located is found, and the distance unit characterized by this column is the distance between the person to be subjected to detection and the fatigue detection system. Fourth, the $m_{max}$-th column signal is extracted from the matrix Q, the arctangent function is utilized to calculate the phase and perform phase unwrapping operation.

(2-4) Waveform reconstruction. Wavelet band-pass filtering is adopted to remove noise, and the respiratory signal and heartbeat signal are extracted respectively. The pass bands $[f_L, f_H]$ of the respiratory signal and heartbeat signal are [0.1, 0.6] Hz and [0.8, 2.5] Hz, respectively.

Figure 4:
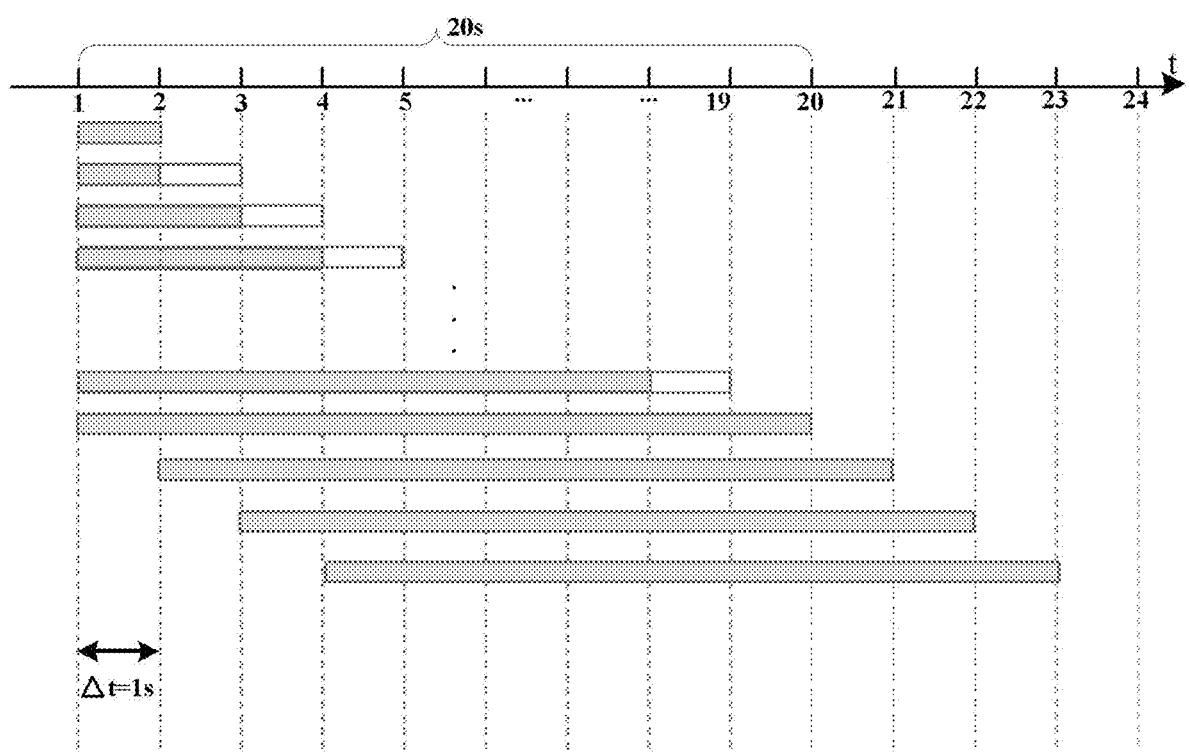
FIG. 4 is a schematic diagram of a sliding window provided by an embodiment of the present disclosure.

(3) The feature extraction module utilizes time-frequency domain analysis, nonlinear analysis and deep learning comprehensively to extract features. In an optional embodiment, a sliding detection window (for example: a sliding window with a length of 20 s and a step size of 1 s) is set as a buffer to extract the features related to mmWave data and video image data in the window, as shown in FIG. 4. Specifically, the feature extraction based on mmWave radar includes two steps: feature extraction and feature selection.

Figure 5:
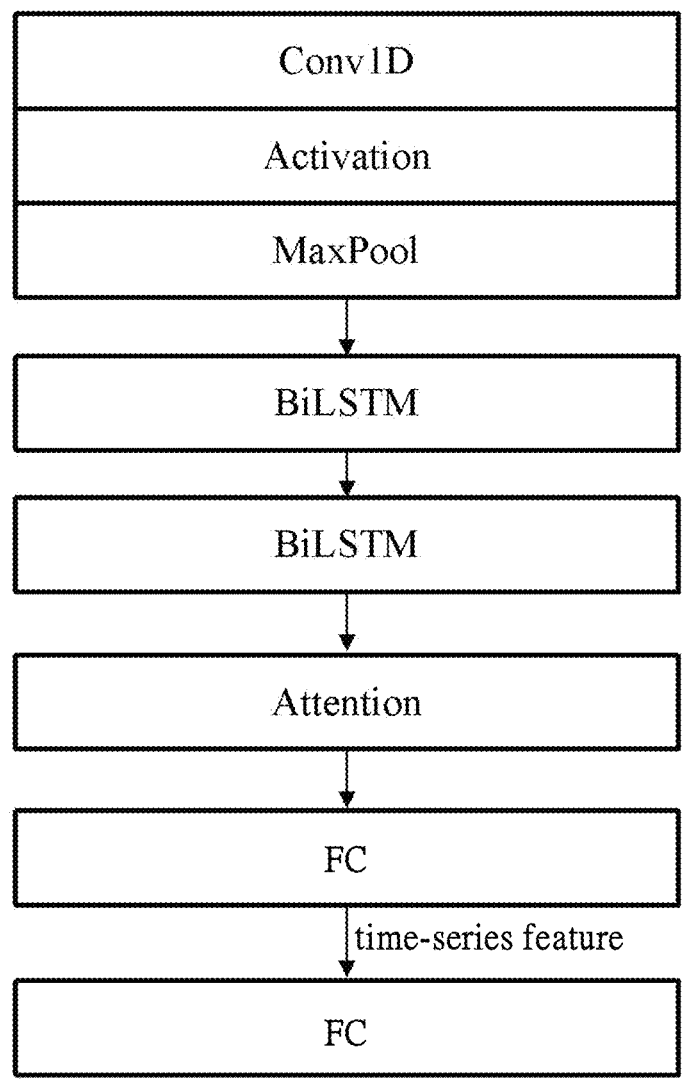
FIG. 5 is a schematic diagram of CNN+BiLSTM structure provided by an embodiment of the present disclosure.

(3-1) Feature extraction. Features of both respiratory signal and heartbeat signal within a sliding detection window are extracted. The specific operation process is as follows. Firstly, time-frequency analysis and nonlinear analysis techniques are utilized comprehensively to extract the time-frequency domain features and nonlinear features of the vital sign signal respectively. Among the signals, for the respiratory signal, the extracted time-frequency domain features and nonlinear features include mean value, variance, power spectral density, fractal dimension, approximate entropy, etc. Specifically, taking the heartbeat signal as an example, the features thereof are shown in Table 1 below, and mainly include: bpm, ibi, sdnn, sdsd, rmssd, pnn20, pnn50 and other time domain features; low-frequency components, high-frequency components, ratio between low and high frequency components and other frequency domain features; as well as approximate entropy, sample entropy, Lyapunov exponent, and other nonlinear features. Then, the time-series features are extracted. Sub-sliding windows are set in the detection window (for example: a sub-sliding window with a window length of 10 s and a step size of 1 s is further set in a 20 s detection window to further subdivide the detection window). After the time-frequency domain features and nonlinear features in each of the sub-windows are extracted respectively, corresponding features are sequentially input into a CNN+BiLSTM model in a chronological order, and the features of the FC layer thereof are extracted to quantify the dynamic changes of respiratory signal and heartbeat signal. The CNN+BiLSTM model is shown in flowchart of FIG. 5, including 1 CNN layer, 2 BiLSTM layers, 1 Attention layer, and 2 FC layers.

TABLE 1

| Heartbeat signal features | | | |
| --- | --- | --- | --- |
| | | Features | Explanation |
| Time domain features | Single-beat | x (systolic peak), y (diastolic peak), cw (curve width), hfd (Higuchi fractal dimensions), irregularity, $Q_1, Q_2, Q_3$, IQR, $t_{sp}, t_{dp}, t_{dn}, \Delta t, w$, $A_2/A_1, x/t_{sp}, y/(t_{pi} - t_3), y/x$, | Systolic peak, diastolic peak, curve width, Higuchi fractal dimension, irregularity, first quartile, second quartile, third quartile, interquartile range, systolic peak time, diastolic peak time, dicrotic notch (DN) time, time difference between systolic peak and diastolic peak, full width at half-systolic peak, inflection point area ratio, |

TABLE 1-continued

Heartbeat signal features

Figure 6:
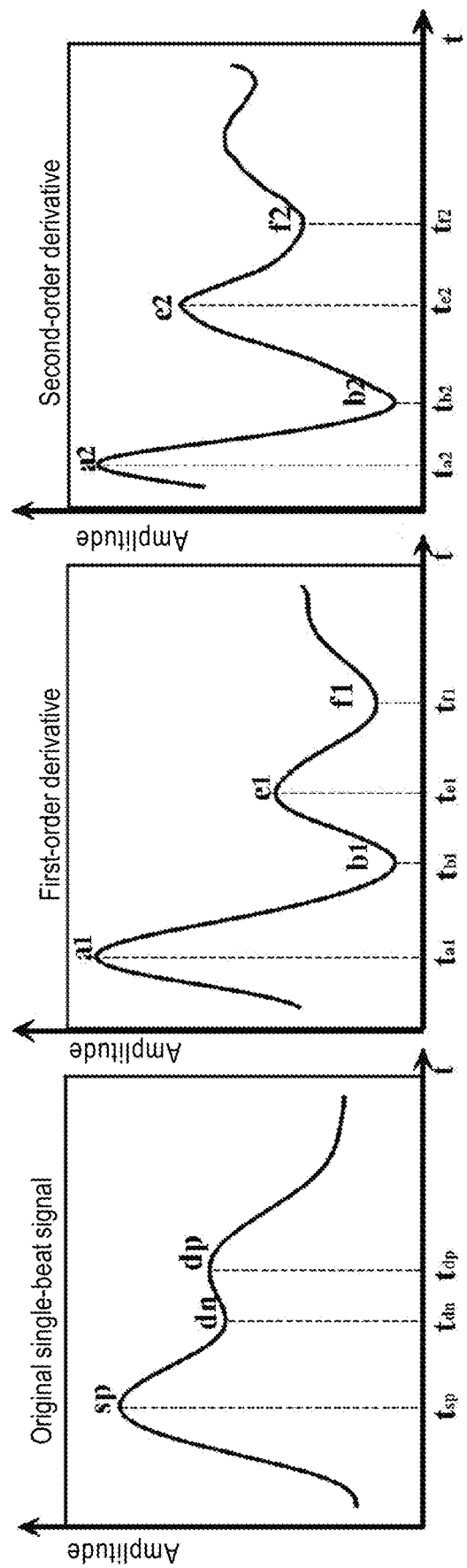
FIG. 6 is a schematic diagram of a single-beat waveform and its feature points of a heartbeat signal provided by an embodiment of the present disclosure.

| | Features | Explanation |
|---|---|---|
| | $(x - y)/x$, DN (dicrotic notch) skewness, kurtosis, RMS (root mean square), harmonic mean $a_1, b_1, e_1, f_1, b_1/a_1$; $a_2, b_2, e_2, f_2, b_2/a_2; t_{a1}, t_{b1}, t_{e1}, t_{f1}, t_{a2}, t_{b2}, t_{e2}, t_{f2}$ | systolic peak rising slope, diastolic peak falling slope, augmentation index, relative augmentation index, dicrotic notch skewness, kurtosis, root mean square, harmonic mean The first-order derivative of a single-beat signal: The first peak value, the first valley value, the second peak value, and the second valley value, the amplitude ratio of the first valley value and the first peak value; The second-order derivative of a single-beat signal: the first peak value, the first valley value, the second peak value, the second valley value, the amplitude ratio of the first valley value and the first peak value; The time corresponding to the fiducial points of the first-order and second-order derivatives of a single-beat (as shown in FIG. 6) |
| Multi-beat | $hr_{mean}, hr_{median\_ad}, hr_{mean\_ad}, hr_{max}, hr_{min}, hr_{max-min}, hr_{std}, hr_{var}$ ibi; $ibi_{mean}, ibi_{max}, ibi_{min}$; sdnn; rmssd, sdsd; PNN20, PNN50; CV (coefficient of variation of peak-to-peak intervals), CVSD (coefficient of variation of successive differences) $sd_1, sd_2, sd_1/sd_2$ | Mean, median absolute deviation, mean absolute deviation, maximum, minimum, difference between maximum and minimum, standard deviation (std), variance of heart rate Inter-beat interval (ibi); mean, maximum, minimum, and overall std of the ibis; root mean square of the successive differences; proportion of NN20 (>20 ms) and NN50 (>50 ms) divided by the total number of NN (R-R) intervals; coefficient of variation of peak-to-peak intervals (i.e. $sdnn/ibi_{mean}$), coefficient of variation of successive differences (i.e. $rmssd/ibi_{mean}$) Spectrum: std of instantaneous (short-term) peak-to-peak interval variability, std of long-term peak-to-peak interval variability, ratio of short-term to long-term std |
| Frequency domain features | PSD, $f_1, f_2, f_3$, LF, HF, LF/HF, TP, $TP_{VLF}, TP_{LF}, TP_{HF}$ $S_{mean}, S_{std}, S_{kurtosis}, S_{skewness}, S_{centroid}, C_{dwt}, C_{dct}, C_{mfc}$ (mel frequency cepstral coefficients), $C_{dbt}$ (daubechies wavelet transform) | Power spectral density, frequency of fundamental component, second harmonic frequency, third harmonic frequency, low frequency component (0.04-0.15 Hz), high frequency component (0.16-0.5 Hz), ratio between low and high frequency components, total power, very low frequency band power (0.003-0.04 Hz), low frequency band power, high frequency band power Spectrum: mean, std, kurtosis, skewness, centroid, discrete wavelet transform coefficients, discrete cosine transform coefficients, Mel-frequency cepstral coefficients, Daubechies wavelet transform coefficients |
| Non-linear features | ApEn (approximate entropy), SampEn (sample entropy), LyE (Lypunov exponent), Hurst, DFA (detrended fluctuation analysis exponent) | Approximate entropy, sample entropy, Lyapunov exponent, Hurst exponent, detrended fluctuation analysis exponent |
| Time-series features | CNN + BiLSTM FC layer features | |

Specifically, the purpose of the single-beat feature lies in extraction of the instantaneous change feature of each heartbeat; the purpose of the multi-beat feature and the frequency domain feature lies in extraction of the long-term change feature of multiple heartbeats; the purpose of the nonlinear feature lies in further extraction of the nonlinear change feature of heartbeats. The nonlinear feature has a high correlation with the fatigue state, and therefore the recognition accuracy of the fatigue state of the classifier may be improved.

(3-2) Feature selection. Typical features associated with fatigue status are selected. First, on the basis of feature preprocessing, redundant features are eliminated, abnormal feature processing and normalization operations are performed. Secondly, polynomial feature generating and deep feature synthesis techniques are adopted to realize the convergence and fusion of time-frequency domain features, nonlinear features, and time-series features. Finally, statistical analysis (such as: PCA and recursive feature elimination, etc.) and machine learning (such as: random forestbased feature selection) are adopted in combination to preliminarily select features that are highly correlated with fatigue state classification labels.

(2) Video Image Processing

The video image processing operation mainly includes: (1) a video acquisition module; (2) a real-time signal processing module; (3) a feature extraction module.

(1) The video acquisition module is specifically configured to: use the video acquisition equipment to collect the video image data of the person to be subjected to detection in real time, and send the data back to the host computer in real time for safekeeping and timely processing.

(2) The real-time signal processing module mainly performs three steps: face detection, face alignment and dataset generation. The specific processing process is as follows:

(2.1) Face detection. A facial feature point sequence is extracted, that is, in an optional embodiment, facial data in a video image is acquired, and facial feature point extraction is performed. First, a harr feature extraction method is adopted to extract the range of interest (ROI) area of the face by detecting the gray-level change of the image, and sum up the pixel coordinates in the area. Then, the landmark algorithm in the dlib library is adopted to extract 68 feature points of the face (including: eyebrows, eyes, nose, mouth and facial contours, etc.) to obtain the feature point sequence p (t):

$$p^{(t)} = \{(x_1^{(t)}, y_1^{(t)}), (x_2^{(t)}, y_2^{(t)}), (x_3^{(t)}, y_3^{(t)}), \ldots, (x_{68}^{(t)}, y_{68}^{(t)})\}$$

In the formula, $(x_i^{(t)}, y_i^{(t)})$ is the coordinate position of the i-th key point at frame t in the video.

(2.2) Alignment of face. Based on the facial feature point sequence, the position of the middle point of the face is calculated according to the point information of the eyes and eyebrows, and the face in the current video sequence is calibrated and aligned by affine transformation.

(2.3) Generating an input dataset. First, the aligned face dataset is adjusted to a picture sized 224*224; secondly, the label corresponding to the fatigue state in each video image is encoded; then, a frame sequence with L frames as a group (L is the total number of frames of the video within the sliding window) is generated. Due to different video sampling frequencies (for example: 25 fps or 30 fps), there are differences in L. Therefore, the video frame is divided into K parts through the temporal segment networks (TSN) processing flow, a frame is randomly selected from each part as the final input frame, thereby obtaining a sequence of K frames, which is then spliced with the label corresponding to fatigue state to generate an input dataset.

(3) The feature extraction module is specifically configured to: perform feature extraction on the dataset generated in the above steps, and provide the recognition result of fatigue detection by means of a classifier. First, the dataset is input into the residual network ResNet50 to extract the spatial features of the video sequence; secondly, the mixed attention model (this model consists of two parts: the self-attention model and the spatial attention model) is adopted to extract inter-frame correlation features: the extracted spatial features are input into the self-attention model to extract the correlation features of a single frame; the correlation features of a single frame are input into the spatial attention model to extract the space-associated features between adjacent frames; a feature fusing operation is performed to combine the spatial features with the correlation features of a single frame and the correlation features between adjacent frames. Next, the fused features are input into the GRU unit to extract the temporal features of the video sequence. Finally, after adjusting the dimension of the feature vector, the adjusted feature vector is input into an FC layer, and the parameters of the FC layer are utilized to characterize the temporal and spatial characteristics of the video sequence.

(3) Technology fusing includes: (1) algorithm design; (2) feature fusion; (3) fatigue detection.

(1) The algorithm design is specifically set to determine the current test status when mmWave technology and video image technology are fused. (i) If there is an abnormality in the video image (such as: the ambient light is not bright or the face is tilted and turns away) and the face cannot be detected, then (there will be no output of video image features, the video data in the detection window will be deleted) fatigue detection is performed based on the mmWave radar; (ii) if there is an abnormality in the mmWave (for example: the person to be subjected to detection shakes continuously during the test or there is a lot of interference in the environment), then (there will be no output of mmWave features, the mmWave data in the detection window will be deleted) fatigue detection is performed based on video images; (iii) if both the mmWave and the video are abnormal, it will show that there is abnormality in detection or there is no subject to be detected, and cycle starts again to continue monitoring; (iv) if both the mmWave and the video are normal, fatigue state recognition is performed through the assistance of a classifier on basis of fusion of the features of the mmWave and the video technologies.

(2) Feature fusion is specifically performed by, firstly, using polynomial feature generating and deep feature synthesis technologies to fuse the mmWave features and video image features of the sliding detection windows and sub-sliding windows thereof, and the fusion of the two technology-related features are preliminarily realized. The preliminarily fused features are merged with mmWave features and video image features to form merged features. Secondly, the Transformer model is adopted to select merged features related to the sliding detection windows and sub-windows thereof based on the attention mechanism. With respect to the sliding windows, the feature selection is performed based on the attention mechanism; with respect to the sub-windows, the feature selection is performed based on the attention mechanism after the related features are sequentially input into the Transformer sequential model in a chronological order; the features selected by the sliding windows and the sub-windows are merged to obtain the fused features.

(3) Fatigue detection is specifically performed by building a three-category model based on Transformer to identify the alertness state, normal state, and fatigue state. In the experiment, the accuracy rate, confusion matrix, ROC curve and AUC area are adopted as the evaluation indicators of fatigue detection. The larger the accuracy rate and the AUC area, the better the recognition effect; the confusion matrix shows the specific prediction accuracy of each category.

Specifically, the three-category model, that is, the classifier is trained through the following steps: determining training samples, and the training samples include fused features of multiple trainers; the fused features of each trainer include the trainer's mmWave radar signal features and facial video features; the mmWave radar features include: time-frequency domain features, nonlinear features, and time-series features of the vital sign signal; the facial video features include: the time domain feature and the spatial domain feature of the person's face; adding a state label to the dataset corresponding to the fused features of each trainer to form a training dataset for each trainer; the state label indicates the trainer's state corresponding to the fused features, and the trainer's state belongs to one of the alert state, normal state and fatigue state; inputting the training dataset of each trainer into the classifier to train the learning classifier in combination with the state labels therein and obtain the trained classifier.

Figure 7:
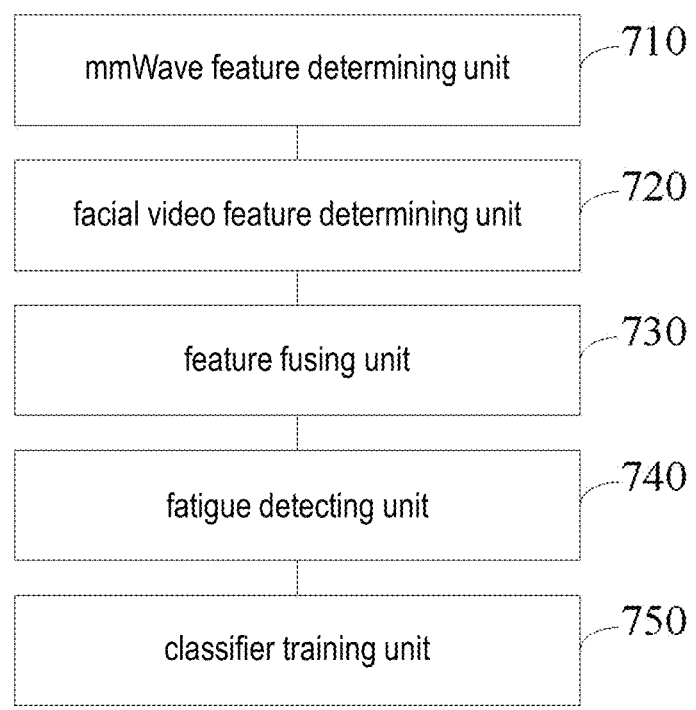
FIG. 7 is a structural diagram of a non-contact fatigue detection system provided by an embodiment of the present disclosure.

FIG. 7 is a structural diagram of a non-contact fatigue detection system provided by an embodiment of the present disclosure. As shown in FIG. 6, the system includes the following: an mmWave feature determining unit 710, which is configured to send an mmWave radar signal to a person to be subjected to detection, receive an echo signal reflected from the person to be subjected to detection; after performing clutter suppression and echo selection on the echo signal, extract a vital sign signal of the person to be subjected to detection, and determine a time-frequency domain feature, a nonlinear feature and a time-series feature of the vital sign signal; and the vital sign signal includes a respiratory signal and a heartbeat signal; a facial video feature determining unit 720, which is configured to acquire a facial video image of the person to be subjected to detection, and perform facial detection and alignment on the basis of the facial video image, so as to extract a time domain feature and a spatial domain feature of the face of the person to be subjected to detection; a feature fusing unit 730, which is configured to fuse the time-frequency domain feature, the nonlinear feature and the time-series feature of the vital sign signal with the time domain feature and the spatial domain feature of the face of the person to be subjected to detection, so as to obtain a fused feature; a fatigue detecting unit 740, which is configured to input the fused feature into a pre-trained classifier to perform fatigue state recognition of the person to be subjected to detection, and determine whether the person to be subjected to detection is in a fatigue state; and the classifier divides, on the basis of the fused feature of the person to be subjected to detection, the state of the person to be subjected to detection into three states, i.e., an alert state, a normal state and a fatigue state, and both the alert and normal states are non-fatigue states; a classifier training unit 750, which is configured to determine training samples, and the training samples include fused features of multiple trainers; the fused features of each trainer include the trainer's mmWave radar signal features and facial video features; the mmWave radar features include: time-frequency domain features, nonlinear features, and time-series features of the vital sign signal; the facial video features include: the time domain feature and the spatial domain feature of the person's face; add a state label to the dataset corresponding to the fused features of each trainer to form a training dataset for each trainer; the state label indicates the trainer's state corresponding to the fused features, and the trainer's state belongs to one of the alert state, normal state and fatigue state; and input the training dataset of each trainer into the classifier to train the learning classifier in combination with the state labels therein and obtain the trained classifier.

Specifically, for implementation of the detailed function of each unit in FIG. 7, please refer to the description in the foregoing method embodiments, and details are not repeated here.

In order to verify the reliability of the non-contact fatigue detection method and system provided by the present disclosure, in this example, 12 persons to be subjected to detection were recruited to participate in two tests with a duration of 10 minutes respectively (two tests, one was carried out under fatigue state, and another test was carried out in the non-fatigue state). Before each test, the persons to be subjected to detection were required to fill in the Karolinska sleepiness scale to assess their fatigue level. In the tests, mmWave devices and mobile phones were utilized to collect mmWave and video data to perform fatigue detection. The test results are shown in Table 2. It can be seen from Table 2 that, first of all, the introduction of mmWave nonlinear features helps to significantly improve the recognition accuracy of fatigue detection, that is, the accuracy, precision, F1 score and value of AUC area are all increased by more than 0.05. Taking the accuracy value as an example, with the introduction of nonlinear features, the accuracy rate increases from 0.698 to 0.752. Secondly, in the fatigue detection method and system provided by the present disclosure, nonlinear features are introduced into mmWave and further combined with mmWave time-series features and video features for fatigue detection. In this way, it is possible to accurately identify the fatigue state, and the recognition accuracy value reaches 0.979.

TABLE 2

Comparison table of fatigue detection results
(average results of 10-fold cross-validation)

|  | Accuracy | Precision | F1 | AUC area |
|---|---|---|---|---|
| mmWave (time-frequency) | 0.698 | 0.713 | 0.698 | 0.696 |
| mmWave (time-frequency + nonlinear) | 0.752 | 0.770 | 0.752 | 0.751 |
| mmWave (time-frequency + nonlinear + time-series) + video | 0.979 | 0.980 | 0.978 | 0.976 |

Generally speaking, compared with the related art, the above technical solution conceived by the present disclosure has the following advantageous effects:

The disclosure provides a non-contact fatigue detection method and system, which simultaneously collects mmWave data and video image data of the person to be subjected to detection. When performing the mmWave radar detection, an mmWave transceiver module is utilized to send the mmWave radar signal to the person to be subjected to detection and the echo signal thereof is collected, and the vital sign signal (including respiratory signal and heartbeat signal) are extracted from the echo signal to calculate their corresponding features.

When performing video image detection, a video acquisition equipment is utilized to continuously collect the facial information of the person to be subjected to detection and extract correlation features. Finally, the features extracted by the two methods are fused, and fatigue detection is performed on basis of the above. The two technologies are fused to effectively suppress the interference caused by subjective and objective factors, and the temporal features and spatial domains of the video image are extracted through the mixed attention mechanism. The nonlinear features and time-series features of mmWave radar are extracted through nonlinear analysis and deep learning to further improve the accuracy of fatigue detection. The method of the disclosure adopts non-contact technology for fatigue detection, and therefore has higher flexibility and compensates for the defects of a single detection technology, and the robustness of detection is improved as well.

It is obvious for those skilled in the art that the above descriptions are only preferred embodiments of the present disclosure, and are not intended to limit the present disclosure. Any modifications, equivalent replacements and improvements made within the spirit and principles of the present disclosure should all be included within the protection scope of the present disclosure.

What is claimed is:

1. A non-contact fatigue detection method, comprising the following steps:

sending a millimeter-wave (mmWave) radar signal to a person to be subjected to detection, receiving an echo signal reflected from the person to be subjected to detection, and after performing clutter suppression and echo selection on the echo signal, extracting a vital sign signal of the person to be subjected to detection, and determining time-frequency domain features, nonlinear features and time-series features of the vital sign signal; wherein the vital sign signal comprise respiratory signal and heartbeat signal;

acquiring a facial video image of the person to be subjected to detection, and performing facial detection and alignment on basis of the facial video image, so as to extract time domain features and spatial domain features of a face of the person to be subjected to detection;

fusing the time-frequency domain features, the nonlinear features and the time-series features of the vital sign signal with the time domain features and the spatial domain features of the face of the person to be subjected to detection, so as to obtain a fused feature;

inputting the fused features into a pre-trained classifier to perform fatigue state recognition of the person to be subjected to detection, and determining whether the person to be subjected to detection is in a fatigue state; wherein the classifier divides, on basis of the fused feature of the person to be subjected to detection, a state of the person to be subjected to detection into three states, i.e., an alert state, a normal state and a fatigue state, wherein both the alert state and normal state are non-fatigue states.

2. The non-contact fatigue detection method according to claim 1, wherein the step of performing facial detection and alignment on basis of the facial video image, so as to extract the time domain features and the spatial domain features of the face of the person to be subjected to detection is specifically as follows:

performing facial detection on the facial video image to extract facial feature points and obtain a facial feature point sequence;

calculating a position of a middle point of the face based on the facial feature point sequence according to point information of eyes and eyebrows in the feature points;

calibrating and aligning the face in a current facial video image by adopting affine transformation;

adjusting an aligned facial video image dataset to a picture of a preset size, generating a frame sequence with L frame images as a group, and dividing the frame sequence into K parts through a time-sensitive network processing flow, randomly selecting a frame from each part as a final input frame to obtain a sequence of K frames and generate a dataset; wherein L and K are both integers greater than 0;

inputting the dataset into a residual network ResNet50 to extract spatial features of the facial video image;

utilizing a mixed attention model to extract inter-frame correlation features, and the mixed attention model is composed of two parts: a self-attention model and a spatial attention model; wherein specifically, the extracted spatial features are input into the self-attention model to extract correlation features of a single frame; the correlation features of the single frame are input into the spatial attention model to extract spatial correlation features between adjacent frames; the spatial features are fused with the correlation features of the single frame and the spatial correlation features between the adjacent frames, and the fused features are input to a gated recurrent unit (GRU) to extract temporal features of the facial video image;

inputting the spatial features and the temporal features of the facial video image to a fully connected (FC) layer, and characterizing the spatial domain features and the time domain features of the face of the person to be subjected to detection by parameters of the FC layer.

3. The non-contact fatigue detection method according to claim 1, wherein after performing clutter suppression and echo selection on the echo signal, the step of extracting the vital sign signal of the person to be subjected to detection, and determining the time-frequency domain features, the nonlinear features and the time-series features of the vital sign signal is specifically as follows:

reconstructing a waveform of the echo signal, specifically: utilizing wavelet bandpass filtering to eliminate noises, wherein the respiratory signal and the heartbeat signal therein are extracted to serve as the vital sign signal;

utilizing time-frequency analysis and nonlinear analysis techniques to extract the time-frequency domain features and the nonlinear features of the vital sign signal; wherein for the respiratory signal, the extracted time-frequency domain features and the nonlinear features comprise mean, variance, power spectral density, fractal dimension, approximate entropy, etc.; for the heartbeat signals, the extracted time domain features comprise single-beat features and multi-beat features; the extracted frequency domain features comprise: low frequency components, high frequency components, ratio between low and high frequency components, spectral kurtosis and skewness, etc.; the extracted nonlinear features comprise: approximate entropy, sample entropy, Lyapunov exponent, Hurst exponent, and detrended fluctuation analysis exponent; a purpose of the single-beat features is to extract an instantaneous change feature of each heartbeat; a purpose of the multi-beat features and the frequency domain features is to extract a long-term change feature of multiple heartbeats; a purpose of the nonlinear features is to further extract a nonlinear change feature of the heartbeat, the nonlinear feature has a high correlation with the fatigue state and therefore is able to improve a fatigue state recognition accuracy of the classifier;

utilizing a deep learning technology to extract the time-series features: wherein first of all, a sub-sliding window is disposed in a detection window, and the time-frequency domain features and the nonlinear features of the vital sign signal in each of the sub-sliding windows are extracted respectively; then, the corresponding features that are extracted in a chronological order are sequentially input into a model with combination of convolutional neural network (CNN) and bidirectional long short-term memory neural network (BiLSTM), features of the FC layer thereof are extracted as the time-series features of the vital sign signal;

selecting features that are relatively highly correlated with fatigue state classification from the extracted features based on statistical analysis and machine learning to serve as the time-frequency domain features, the nonlinear features, and the time-series features of the final vital sign signal.

4. The non-contact fatigue detection method according to claim 1, wherein the step of fusing the time-frequency domain features, the nonlinear features and the time-series features of the vital sign signal with the time domain features and the spatial domain features of the face of the person to be subjected to detection, so as to obtain the fused feature is specifically as follows:
utilizing polynomial feature generating and deep feature synthesis technologies to fuse the time-frequency domain features, the nonlinear features and the time-series features of the vital sign signal of sliding detection windows and sub-windows thereof, as well as the time domain features and the spatial domain features of the face of the persons to be subjected to detection, thereby obtaining preliminary fused features;
merging the preliminary fused features with the time-frequency domain features, the nonlinear features, and the time-series features of the vital sign signal as well as the time domain features and the spatial domain features of the face of the person to be subjected to detection, thereby obtaining merged features;
utilizing a transformer model to select the merged features of the sliding detection windows and the sub-windows thereof based on an attention mechanism; for the sliding detection windows, feature selection is performed based on the attention mechanism; for the sub-windows, after inputting the corresponding features into the transformer time-series model in a chronological order, feature selection is performed based on the attention mechanism; merging the features selected by the sliding detection windows and the sub-windows to obtain the fused features of the person to be subjected to detection.

5. The non-contact fatigue detection method according to claim 1, wherein the classifier is trained through the following steps:
determining training samples, wherein the training samples comprise fused features of multiple trainers; the fused features of each of the trainers comprise the trainer's mm Wave radar signal features and facial video features; the mmWave radar features comprise: the time-frequency domain features, the nonlinear features, and the time-series features of the vital sign signal; the facial video features comprise: the time domain features and the spatial domain features of the person's face;
adding a state label to a dataset corresponding to the fused features of each of the trainers to form a training dataset for each of the trainers; wherein the state label indicates a trainer's state corresponding to the fused features, and the trainer's state belongs to one of the alert state, the normal state and the fatigue state;
inputting the training dataset of each of the trainers into the classifier to train the learning classifier in combination with the state labels therein and obtain the trained classifier.

6. The non-contact fatigue detection method according to claim 2, wherein the classifier is trained through the following steps:
determining training samples, wherein the training samples comprise fused features of multiple trainers; the fused features of each of the trainers comprise the trainer's mm Wave radar signal features and facial video features; the mmWave radar features comprise: the time-frequency domain features, the nonlinear features, and the time-series features of the vital sign signal; the facial video features comprise: the time domain features and the spatial domain features of the person's face;
adding a state label to a dataset corresponding to the fused features of each of the trainers to form a training dataset for each of the trainers; wherein the state label indicates a trainer's state corresponding to the fused features, and the trainer's state belongs to one of the alert state, the normal state and the fatigue state;
inputting the training dataset of each of the trainers into the classifier to train the learning classifier in combination with the state labels therein and obtain the trained classifier.

7. The non-contact fatigue detection method according to claim 3, wherein the classifier is trained through the following steps:
determining training samples, wherein the training samples comprise fused features of multiple trainers; the fused features of each of the trainers comprise the trainer's mmWave radar signal features and facial video features; the mmWave radar features comprise: the time-frequency domain features, the nonlinear features, and the time-series features of the vital sign signal; the facial video features comprise: the time domain features and the spatial domain features of the person's face;
adding a state label to a dataset corresponding to the fused features of each of the trainers to form a training dataset for each of the trainers; wherein the state label indicates a trainer's state corresponding to the fused features, and the trainer's state belongs to one of the alert state, the normal state and the fatigue state;
inputting the training dataset of each of the trainers into the classifier to train the learning classifier in combination with the state labels therein and obtain the trained classifier.

8. The non-contact fatigue detection method according to claim 4, wherein the classifier is trained through the following steps:
determining training samples, wherein the training samples comprise fused features of multiple trainers; the fused features of each of the trainers comprise the trainer's mmWave radar signal features and facial video features; the mmWave radar features comprise: the time-frequency domain features, the nonlinear features, and the time-series features of the vital sign signal; the facial video features comprise: the time domain features and the spatial domain features of the person's face;
adding a state label to a dataset corresponding to the fused features of each of the trainers to form a training dataset for each of the trainers; wherein the state label indicates a trainer's state corresponding to the fused features, and the trainer's state belongs to one of the alert state, the normal state and the fatigue state;
inputting the training dataset of each of the trainers into the classifier to train the learning classifier in combination with the state labels therein and obtain the trained classifier.

* * * * *